United States Patent
Siemens et al.

(10) Patent No.: US 7,113,492 B2
(45) Date of Patent: Sep. 26, 2006

(54) AUDIO BROADCAST IN CORDLESS DIGITAL SYSTEM

(75) Inventors: Gerhard Siemens, Round Rock, TX (US); Uwe Sydon, Round Rock, TX (US); Juergen Kockmann, Austin, TX (US); Olaf Dicker, Austin, TX (US); Holger Steinbach, Round Rock, TX (US)

(73) Assignee: Siemens Communications Inc., Boca Raton, FL (US)

( * ) Notice: Subject to any disclaimer, the term of this patent is extended or adjusted under 35 U.S.C. 154(b) by 1246 days.

(21) Appl. No.: 09/779,014

(22) Filed: Feb. 7, 2001

(65) Prior Publication Data

US 2002/0105920 A1    Aug. 8, 2002

(51) Int. Cl.
*H04L 5/14* (2006.01)
*H04J 3/00* (2006.01)

(52) U.S. Cl. ............... 370/294; 370/312; 370/336; 455/426.1; 455/463

(58) Field of Classification Search ........... 370/294, 370/347, 337, 442, 332, 321, 312, 336, 277, 370/280, 330; 455/515, 464, 560, 62, 462, 455/465, 555, 434, 463, 451, 456.1, 507, 455/517, 59

See application file for complete search history.

(56) References Cited

U.S. PATENT DOCUMENTS

| | | | | |
|---|---|---|---|---|
| 5,386,435 A * | 1/1995 | Cooper et al. | ............... | 375/134 |
| 5,528,623 A * | 6/1996 | Foster, Jr. | ............... | 375/133 |
| 5,911,120 A * | 6/1999 | Jarett et al. | ............... | 455/417 |
| 5,930,246 A * | 7/1999 | Akutsu | ............... | 370/337 |
| 6,005,857 A * | 12/1999 | Honkasalo et al. | ............... | 370/337 |
| 6,026,084 A * | 2/2000 | Fukuda | ............... | 370/347 |
| 6,091,961 A * | 7/2000 | Khalil | ............... | 455/466 |
| 6,128,276 A * | 10/2000 | Agee | ............... | 370/208 |
| 6,128,504 A * | 10/2000 | Ciccone | ............... | 455/464 |
| 6,272,121 B1 * | 8/2001 | Smith et al. | ............... | 370/329 |
| 6,278,880 B1 * | 8/2001 | Sipila et al. | ............... | 455/436 |
| 6,449,480 B1 * | 9/2002 | Brownlee et al. | ............... | 455/435.1 |

* cited by examiner

*Primary Examiner*—Doris H. To
*Assistant Examiner*—Ian N. Moore

(57) ABSTRACT

Providing an audio broadcast for a TDMA system. During a single time slot, an audio message is broadcast from a base art and received at a number of portable arts. An audio broadcast command is generated by designating the single time slot and then transmitted to the plurality of portable parts. An additional portable part transmits a broadcast origination signal and the audio message to the base part which transmits the audio broadcast command to the portable parts. by assigning a time slot other than the designated time slot to a portable part, the portable part does not broadcast audio messages during the designated time slot. More than three receiving time slots and more than three sending time slots are divided out for the base art that includes the designated time slot. The audio broadcast command is transmitted during at least two of the more than three sending time slots.

4 Claims, 4 Drawing Sheets

AUDIO BROADCAST IN CORDLESS DIGITAL SYSTEM

BACKGROUND OF THE INVENTION

The present invention relates to personal telephone systems, that are able to transmit and receive digital signals between fixed sets and fixed stations in a cordless system. More particularly, the present invention relates to audio broadcasts on such cordless telephone systems.

Time division multiple access (TDMA) cordless phone systems provide a base unit which is able to provide connections for a plurality of mobile units, such as handsets. Such TDMA systems use time division to provide a plurality of slots, where the base (fixed part (FP)) transmits to an individual (portable part (PP)) mobile unit during a particular slot of time and receives from the individual mobile unit during a particular slot of time. Some TDMA standards may be WDCT, HOME-RF, and Bluetooth. One standard for TDMA systems is the Digital European Cordiess Telecommunications DEC Common interface standard described in ETS 300 175-2 and ETS 300 175-3, published by the European Telecommunication Standards Institute. The DECT standard is also discussed in U.S. Pat. No. 6,078,574 entitled "PROCESS AND APPARATUS FOR ACTION CONTROL IN A TIME SLOT METHOD", to Boetzel et al. issued Jun. 20, 2000 and U.S. Pat. No. 6,088,338 entitled "METHOD AND SYSTEM FOR THE DETERMINATION OF THE PSCN PARAMETER STARTING FROM THE MFN PARAMETER IN A DECT CORDLESS TELEPHONE SYSTEM" to Rossella et al. issued Jul. 11, 2000, which are incorporated by reference. Generally, the DECT standard may not provide a specification to send a voice message to all mobile units simultaneously as a broadcast. DECT may allow a text broadcast that sends a text message from one unit to all units.

It is desirable to provide a broadcast mode that allows a user to transmit an audio broadcast to all units.

SUMMARY OF THE INVENTION

To achieve the foregoing and other objects and in accordance with the purpose of the present invention an audio broadcast for a time division multiple access system is provided. Generally, an audio message is broadcast from a base part during a single time slot of a time division. The audio message is received by portable parts. The portable parts convert the audio message into sound.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
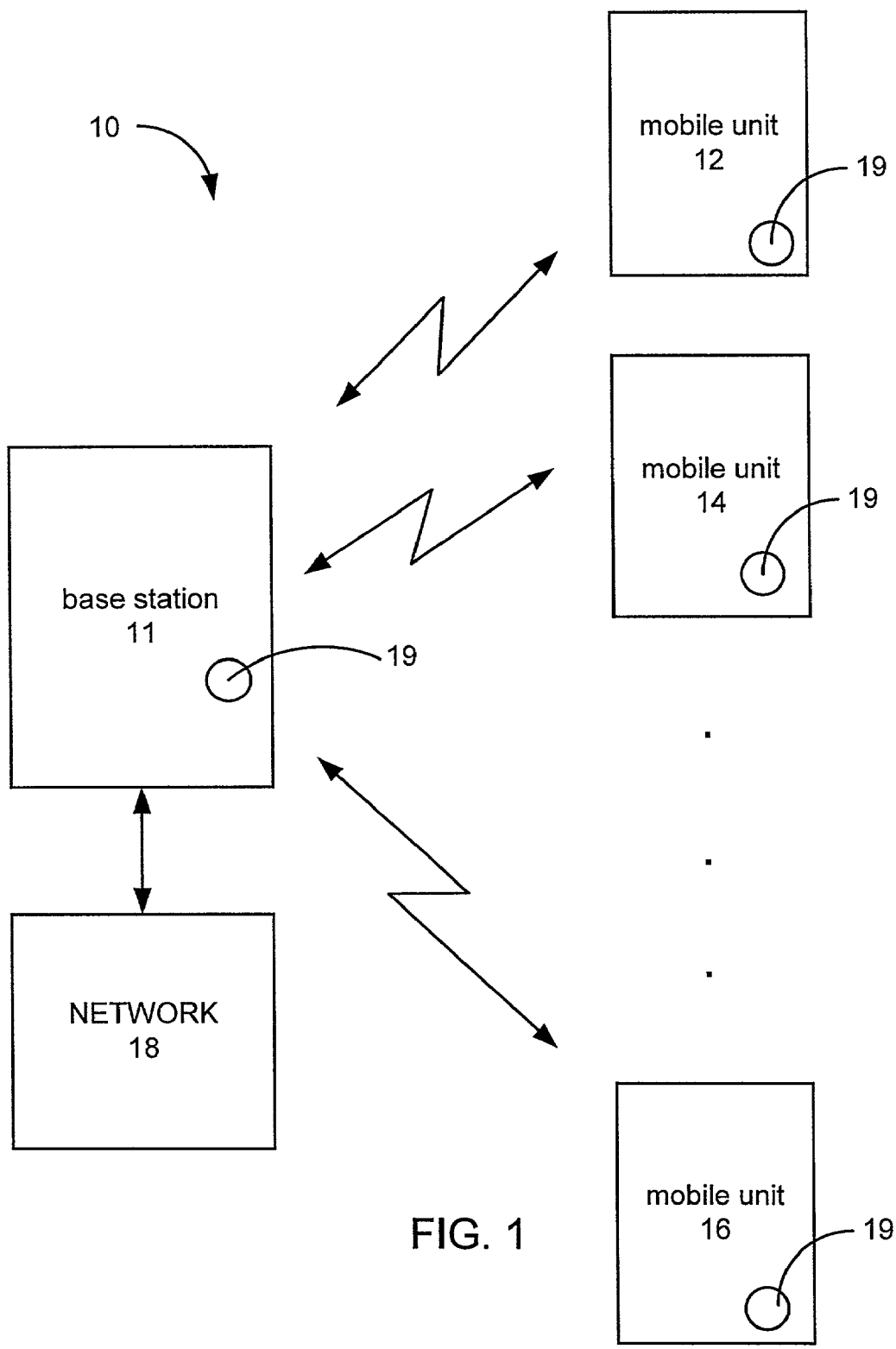
FIG. 1 is a schematic view of a cordless system that uses the invention.

To facilitate discussion, FIG. 1 is a schematic view of a cordless system 10, such as a cordless telephone system that utilizes the invention. The cordless system 10 comprises a base part 11 and a plurality of portable parts 12, 14, 16. The base part 11 of the cordless system 10 is connected to a network 18. The plurality of portable parts 12, 14, 16 communicate with the base part 11, which provides communications between the plurality of portable parts 12, 14, 16 and the network 18. Although only three portable parts 12, 14, 16 are illustrated more than three portable parts are possible. For example there may be twelve portable parts communicating to the base part 11. In this embodiment of the invention, time division multiple access (TDMA) is used to provide communication between each of the plurality of portable parts 12, 14, 16 and the base part 11. The base part 11 and the plurality of portable parts 12, 14, 16 each have a broadcast button 19.

Figure 2:
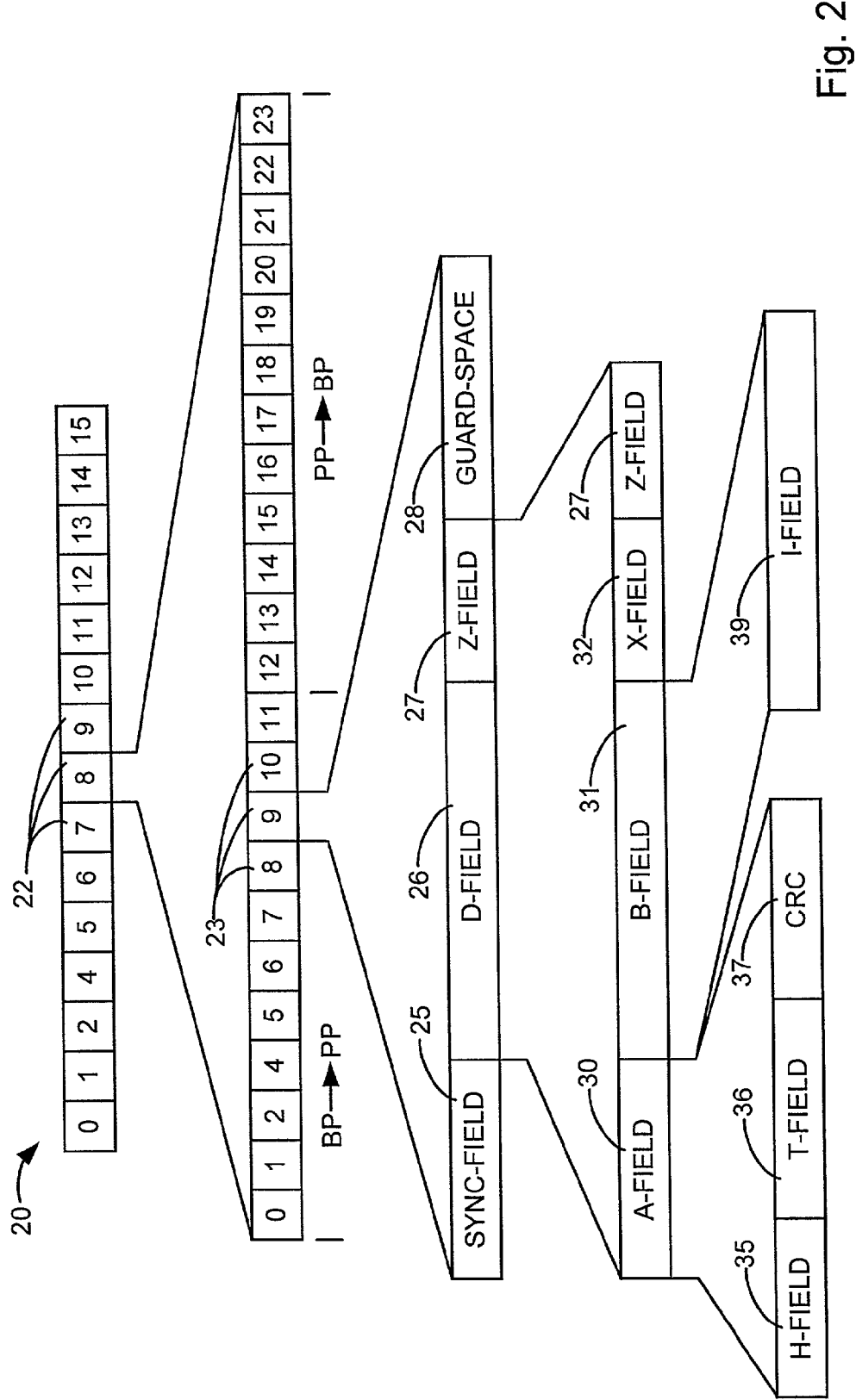
FIG. 2 shows a DECT frame structure.

FIG. 2 illustrates a DECT frame structure that uses TDMA and may be used in an embodiment of the invention. A multiframe 20 may contain sixteen frames 22. Each frame 22 of the multiframe 20 may be 10 ms (milliseconds). Each frame 22 of the multiframe 20 may be split into two sets of twelve full slots 23 of equal size. The slots 23 may be time slots. The base part 11 may transmit to the plurality of portable parts 12, 14, 16 for the first 5 ms., corresponding to slots 0 to 11 (illustrated as the BP→PP (base part to portable part transmission)). For the second 5 ms., corresponding to slots 12 to 23 (illustrated as the PP→BP (base part to portable part transmission)) the base part may receive from the plurality of portable parts 12, 14, 16. A pair of time slots 23, such as slots 0 and 12, or 1 and 13 for transmitting and receiving may form a connection (channel). Each portable part 12, 14, 16 may be assigned a slot 23 from the first 5 ms. and a slot 23 from the second 5 ms., so that each portable part 12, 14, 16 may be assigned a channel. Since there are twelve channels, the base part 11 may accommodate twelve portable parts.

Each time slot 23 may last for 416 µs, which may correspond to 480 bits. Each time slot may be split into a 32 bit synchronization field (sync-field) 25, a 388 bit D-field 26, a four bit Z-field 27, and a 56 bit guard space 28. The D-field 26 may comprise a 64 bit A-field 30, a 320 B-field 31, and a four bit X-field 32. The A field 30 may comprise an eight bit header (H-field) 35, a forty bit tail (T-field) 36, and a 16 bit redundancy (CRC) 37. The B-field 31 may comprise a 320 bit information field (I-field) 39. The I-field 39 may be used to carry data, such as part of a digitized audio message. The header 35 may describe the information in the tail 36. Various commands and command information, such as identification commands, frequency information, slot/frame information, and slot commands may be placed in the tail 36.

The base part 11 and portable parts 12, 14, 16 receive messages and process the commands in the tail 36.

Figure 3:
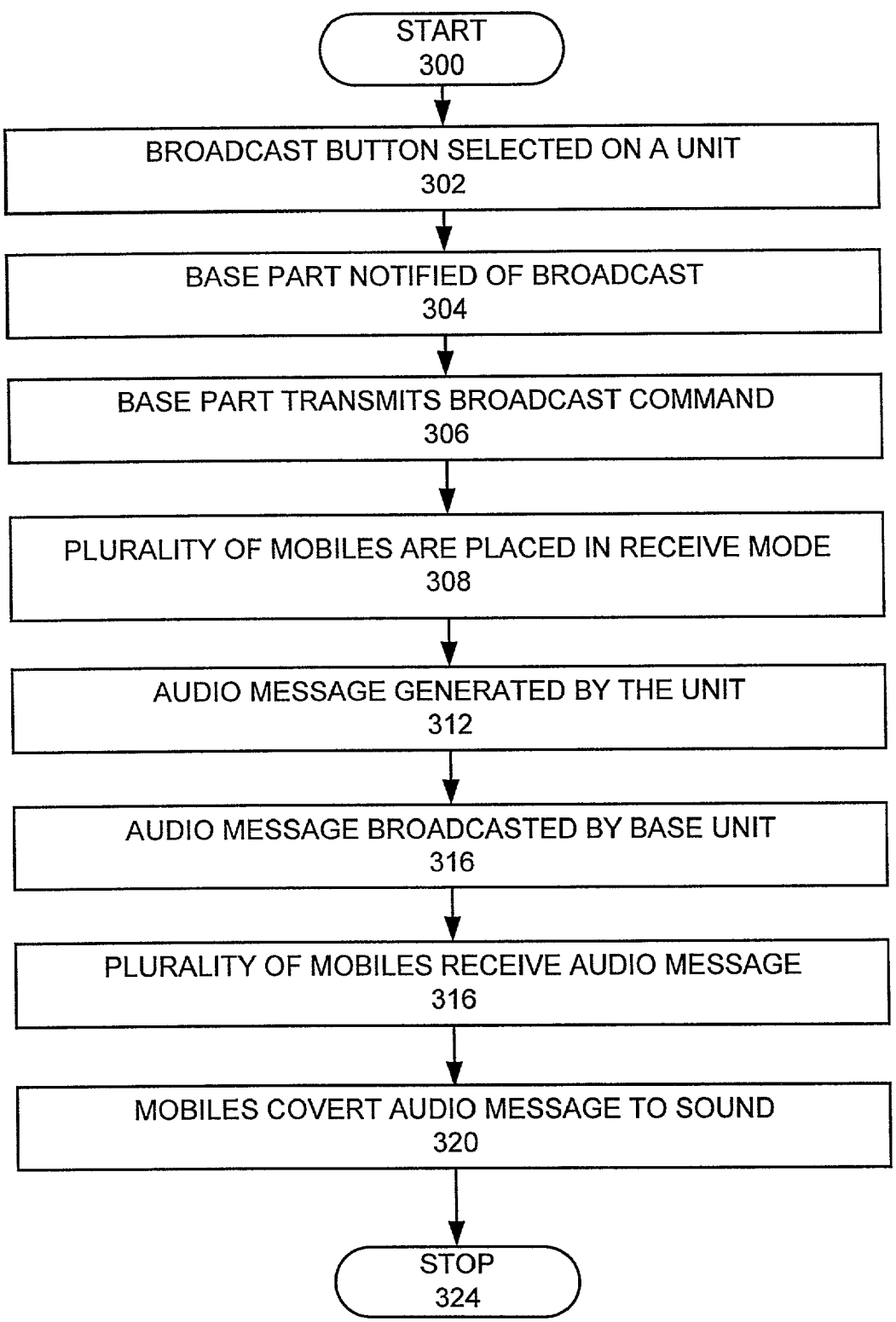
FIG. 3 is a flow chart of a method used in an embodiment of the invention.

FIG. 3 is a high level flow chart of a method used in the preferred embodiment of the invention. A broadcast button 19 (FIG. 1) is selected on a unit (step 302). The base part 11 and the portable parts 12, 14, 16 may have broadcast buttons 19, that allow either the base part 11 or one of the portable parts 12, 14, 16 to broadcast. The broadcast button 19 may be a button dedicated only to broadcasting or one or more general purpose buttons, which may be pushed in a special sequence for broadcasting. The base part 11 is notified of the selection of the broadcast button 19 (step 304). If the broadcast button 19 on the base part 11 is selected, then the selection of the broadcast button 19 is noted by the base part 11. If the broadcast button 19 on one of the portable parts 12, 14, 16 is selected, a broadcast command may be placed in the T-field 36 of a message sent to the base part 11. The base part is then notified of the selection of the broadcast button 19. In this example, the broadcast button 19 for the first portable part 12 is selected, where the first portable part uses slots 1 and 13. The base part 11 receives a message during slot 13 with a broadcast command in the T-field 36, which the base part 11 recognizes as a broadcast request from the first portable part 12.

The base part 11 then transmits a broadcast command (step 306). In this example, the base part transmits broadcast command messages during slots 0 and 2–11 with a broadcast command in the T-field with a slot designation, for example slot 4. The remaining plurality of portable parts 14, 16 receive the broadcast command messages. The broadcast command in the T-field causes the remaining plurality of portable parts 14, 16 to go a receive only mode and become synchronized to receive signals from the designated slot, in this example slot 4 (step 308). The first portable part 12 may transmit a plurality of messages with digitized audio information in the I-field 39 (step 312). The base part 11 receives the messages from the first portable part 12 at slot 13 and sends broadcast messages with the same digitized audio text during slot 4, thus rebroadcasting the audio message (step 316). Since the remaining plurality of portable parts 14, 16 are in a receiving mode and synchronized with slot 4, all of the remaining plurality of portable parts 14, 16 receive the audio message (step 316) and access the digital data in the I-field 39 to convert the audio message to sound (step 320). The first portable part 12 or the base part 11 may terminate the broadcast mode by having the base part 11 transmit a message that commands the remaining plurality of portable parts 14, 16 to synchronize with different slots.

If the broadcast button 19 on the base part 11 is selected, then the broadcast audio message is generated at the base part 11. In such a case, the broadcast message is not received by the base part 11 through one of the slots.

In one embodiment of the invention, if a portable part of the remaining plurality of portable parts is busy (i.e. Is being used for a telephone conversation) that portable part will ignore the broadcast message.

The network 18 may be a regular telephone system. In the alternative, the network 18 may form a network of base parts. Such a network may form a large network of base parts communicating with portable parts. In such a situation, it may be desirable to provide an audio broadcast to portable parts associated with all of the base parts. In such a case, the base part 11 may also send the audio message to the network 18 of base parts, which broadcast the audio message to the portable parts using the above mentioned method.

Figure 4:
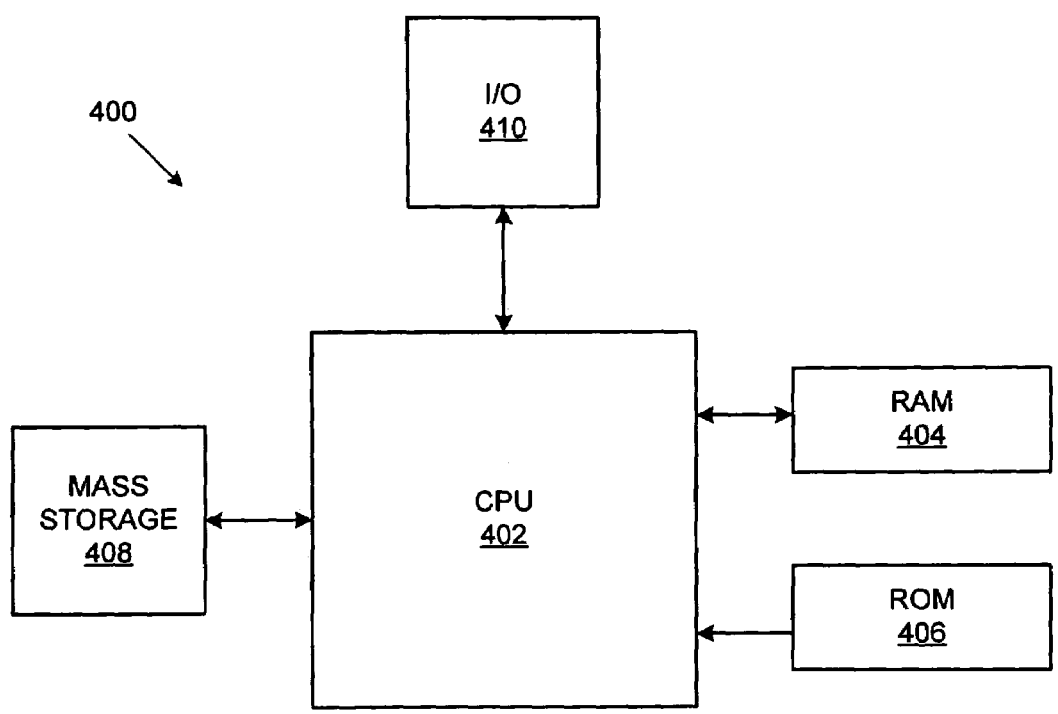
FIG. 4 is a schematic view of a computer that may be used in the base part and the portable parts

A representative computer 400 schematically in FIG. 4 may be placed in the base part 11 and each of the portable parts 12, 14, 16 where each computer allows the base part 11 and portable parts 12, 14, 16 to process the frames and commands in the frames. Computer 400 includes a central processing unit (CPU) 402, which may be a single chip or part of a single chip and which may be coupled bidirectionally with random access memory (RAM) 404 and unidirectionally with read only memory (ROM) 406. Typically, RAM 404 is used as a "scratch pad" memory and includes programming instructions and data, including distributed objects and their associated code and state, for processes currently operating on CPU 402. ROM 406 typically includes basic operating instructions, data and objects used by the computer to perform its functions. In addition, a mass storage device 408, such as a hard disk, CD ROM, magneto-optical (floptical) drive, tape drive or the like, may be coupled bidirectionally with CPU 402. Mass storage device 408 generally may include additional programming instructions, data and objects that typically are not in active use by the CPU, although the address space may be accessed by the CPU, e.g., for virtual memory or the like. To provide compactness to the base part and portable parts, mass storage may be omitted. Each of the above described computers optionally may include an input/output source 410 that typically includes input media such as a keyboard, pointer devices (e.g., a mouse or stylus) and/or network connections which may form other parts of the base part or portable parts. The CPU and associated commands may be used to provide the inventive base and portable part functions described above.

While this invention has been described in terms of several preferred embodiments, there are alterations, permutations, and substitute equivalents which fall within the scope of this invention. It should also be noted that there are many alternative ways of implementing the methods and apparatuses of the present invention. It is therefore intended that the following appended claims be interpreted as including all such alterations, permutations, and substitute equivalents as fall within the true spirit and scope of the present invention.

What is claimed is:

1. A method for providing an audio broadcast for a time division multiple access system with a base part and a plurality of portable parts, comprising:

broadcasting an audio message from the base part during a single time slot of a time division;

receiving the audio message at the plurality of portable parts at least one of which is a hands free unit;

automatically converting the audio message into sound by the plurality of portable parts;

generating an audio broadcast command at the base part by designating the single time slot;

placing the plurality of portable parts in a receive only mode by synchronizing the plurality of portable parts to the a single time slot and turning on only speakers without turning on microphones of the plurality of portable parts;

transmitting the audio broadcast command from the base part to the plurality of portable parts;

transmitting a broadcast origination signal from an additional portable part to the base part;

transmitting the audio message from the additional portable part to the base part;

transmitting the audio broadcast command from the base part to the plurality of portable parts;

assigning a time slot other than the designated time slot to at least one portable unit before the transmitting of the audio broadcast from the base part such that the at least one of the portable parts so assigned does not broadcast audio messages during the designated time slot; and dividing out more than three receiving time slots and more than three sending time slots for the base part, wherein the designated time slot is one of the more than three sending time slots and wherein the transmitting audio broadcast command is transmitted during at least two of the more than three sending time slots.

2. The method as recited in claim 1, wherein the base part and the plurality of portable parts form a time division multiple access cordless telephone system.

3. The method, as recited in claim 1, wherein the base pad and all of the portable parts have a broadcast indicator.

4. The method, as recited in claim 3, wherein the broadcast indicators are buttons.

* * * * *